United States Patent
Hsu et al.

(10) Patent No.: US 9,665,161 B2
(45) Date of Patent: May 30, 2017

(54) METHOD AND COMPUTER-READABLE MEDIUM FOR DYNAMICALLY MANAGING POWER OF MULTI-CORE PROCESSOR

(71) Applicant: MEDIATEK INC., Hsin-Chu (TW)

(72) Inventors: Jih-Ming Hsu, Taoyuan (TW); Wen-Tsan Hsieh, Hsinchu County (TW); Che-Ming Hsu, Miaoli County (TW); Yeh-Ji Chou, Taoyuan (TW); Jen-Chieh Yang, Hsinchu (TW); Shih-Yen Chiu, Hsinchu (TW); Wan-Ching Huang, Hsinchu (TW); Ming-Hsien Lee, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/811,851

(22) Filed: Jul. 29, 2015

(65) Prior Publication Data
US 2016/0062447 A1     Mar. 3, 2016

Related U.S. Application Data

(60) Provisional application No. 62/042,313, filed on Aug. 27, 2014.

(51) Int. Cl.
G06F 1/00     (2006.01)
G06F 1/32     (2006.01)

(52) U.S. Cl.
CPC ............ *G06F 1/3243* (2013.01); *G06F 1/324* (2013.01); *G06F 1/3296* (2013.01); *Y02B 60/1217* (2013.01); *Y02B 60/1285* (2013.01)

(58) Field of Classification Search
CPC ..................................................... G06F 1/3203
USPC .......................................................... 713/300
See application file for complete search history.

(56) References Cited

U.S. PATENT DOCUMENTS

| | | | |
|---|---|---|---|
| 7,721,127 B2 * | 5/2010 | Vishin | G06F 1/3203 712/231 |
| 8,510,740 B2 * | 8/2013 | Salsbery | G06F 1/3203 702/182 |
| 9,423,858 B2 * | 8/2016 | Mann | G06F 1/3206 |
| 9,436,253 B2 * | 9/2016 | Lee | G06F 1/324 |
| 2005/0046400 A1 | 3/2005 | Rotem | |
| 2006/0149975 A1 | 7/2006 | Rotem | |
| 2009/0049314 A1 * | 2/2009 | Taha | G06F 1/3203 713/300 |
| 2009/0089543 A1 | 4/2009 | Gunther | |
| 2009/0109230 A1 | 4/2009 | Miller | |
| 2012/0089852 A1 | 4/2012 | Muthukumar | |
| 2013/0227326 A1 * | 8/2013 | Gwak | G06F 1/3287 713/324 |

(Continued)

*Primary Examiner* — Suresh Suryawanshi
(74) *Attorney, Agent, or Firm* — Winston Hsu; Scott Margo

(57) ABSTRACT

A method and a computer-readable medium for dynamically managing power of a multi-core processor of a computing system are provided. The multi-core processor generates a dynamic voltage and frequency scaling (DVFS) table, determines a first index by alternatively selecting either a power budget or a required performance thereof, determines a current thread level parallelism (TLP) of the computing system, selects one of entries according to the current TLP and the first index, and configure first cores and second cores thereof according to a first settings and a second settings of the selected entry.

20 Claims, 5 Drawing Sheets

(56) References Cited

U.S. PATENT DOCUMENTS

| | | | |
|---|---|---|---|
| 2014/0068285 A1* | 3/2014 | Lee | G06F 1/324 |
| | | | 713/300 |
| 2014/0137123 A1* | 5/2014 | Hartmann | G06F 1/3203 |
| | | | 718/102 |
| 2014/0237267 A1 | 8/2014 | Wang | |

* cited by examiner

METHOD AND COMPUTER-READABLE MEDIUM FOR DYNAMICALLY MANAGING POWER OF MULTI-CORE PROCESSOR

CROSS REFERENCE TO RELATED APPLICATIONS

This application claims the benefit of U.S. Provisional Application No. 62/042,313, filed on Aug. 27, 2014, the contents of which are incorporated herein in their entirety.

BACKGROUND

The present invention relates to a method of power management, and more particularly, to a method and a computer-readable medium for dynamically managing power of the multi-core processor of a computing system.

Power saving is always an important issue for implementation of electronic devices such as mobile phones, personal or portable navigation devices (PNDs), digital cameras, personal computers, etc., no matter whether the electronic devices are portable or not. In order to reduce the power consumption of the electronic devices, and more particularly, those powered by batteries, conventional methods of the related art typically focus on sacrificing performance for power saving. However, when products are implemented based upon the conventional methods, many problems may occur. For example, non-smooth playback of music may occur when a conventional product operates in a power saving mode.

In addition, for modern mobile app programmers, effectively balancing powerful computing device capabilities with power and thermal constraints can often be a significant challenge. Programmers seek to meet user performance needs without overheating the device or causing rapid battery drain. And, for consumers, power consumption is one of the leading criteria in making a mobile device purchase decision. The related art does not serve the programmers and users well, and therefore, a novel method is required to improve power control of the electronic devices.

SUMMARY

The present invention provides a method for dynamically managing power of a multi-core processor of a computing system. The multi-core processor has a plurality of first cores and a plurality of second cores. The method comprises steps of generating at least a dynamic voltage and frequency scaling (DVFS) table with a plurality of entries, each of which comprises a first settings for the first cores and a second settings for the second cores; determining a first index by alternatively selecting either a power budget or a required performance of the multi-core processor; determining a current thread level parallelism (TLP) of the computing system; selecting one of entries according to the current TLP and the first index; and configuring the first cores according to the first settings of the selected entry and configuring the second cores according to the second settings of the selected entry.

The present invention also provides a computer-readable medium. The computer-readable medium stores instructions which cause a computer system to execute a power management process for dynamically adjusting power settings of a plurality of first cores and a plurality of second cores of a multi-core processor of a computing system. The power management process comprises steps of: generating at least a dynamic voltage and frequency scaling (DVFS) table with a plurality of entries, each of which comprises a first settings for the first cores and a second settings for the second cores; determining a first index by alternatively selecting either a power budget or a required performance of the multi-core processor; determining a current thread level parallelism (TLP) of the computing system; selecting one of entries according to the current TLP and the first index; and configuring the first cores according to the first settings of the selected entry and configuring the second cores according to the second settings of the selected entry.

These and other objectives of the present invention will no doubt become obvious to those of ordinary skill in the art after reading the following detailed description of the preferred embodiment that is illustrated in the various figures and drawings.

DETAILED DESCRIPTION

While the embodiments are described herein are for particular applications, it should be understood that the disclosed embodiments are not limited thereto. Those skilled in the art with access to the teachings provided herein will recognize additional modifications, applications, and embodiments within the scope thereof and additional fields in which the disclosed embodiments would be of significant utility.

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . .". Also, the term "couple" is intended to mean either an indirect or direct electrical connection. Accordingly, if one device is coupled to another device, that connection may be through a direct electrical connection, or through an indirect electrical connection via other devices and connections.

Embodiments may be used in any computing system, for example, a graphic processing system, an entertainment system, a media system, a game system, a communication device, a workstation, a desktop computer, a laptop computer, a mobile phone, or any system using a multi-core processor.

Figure 1:
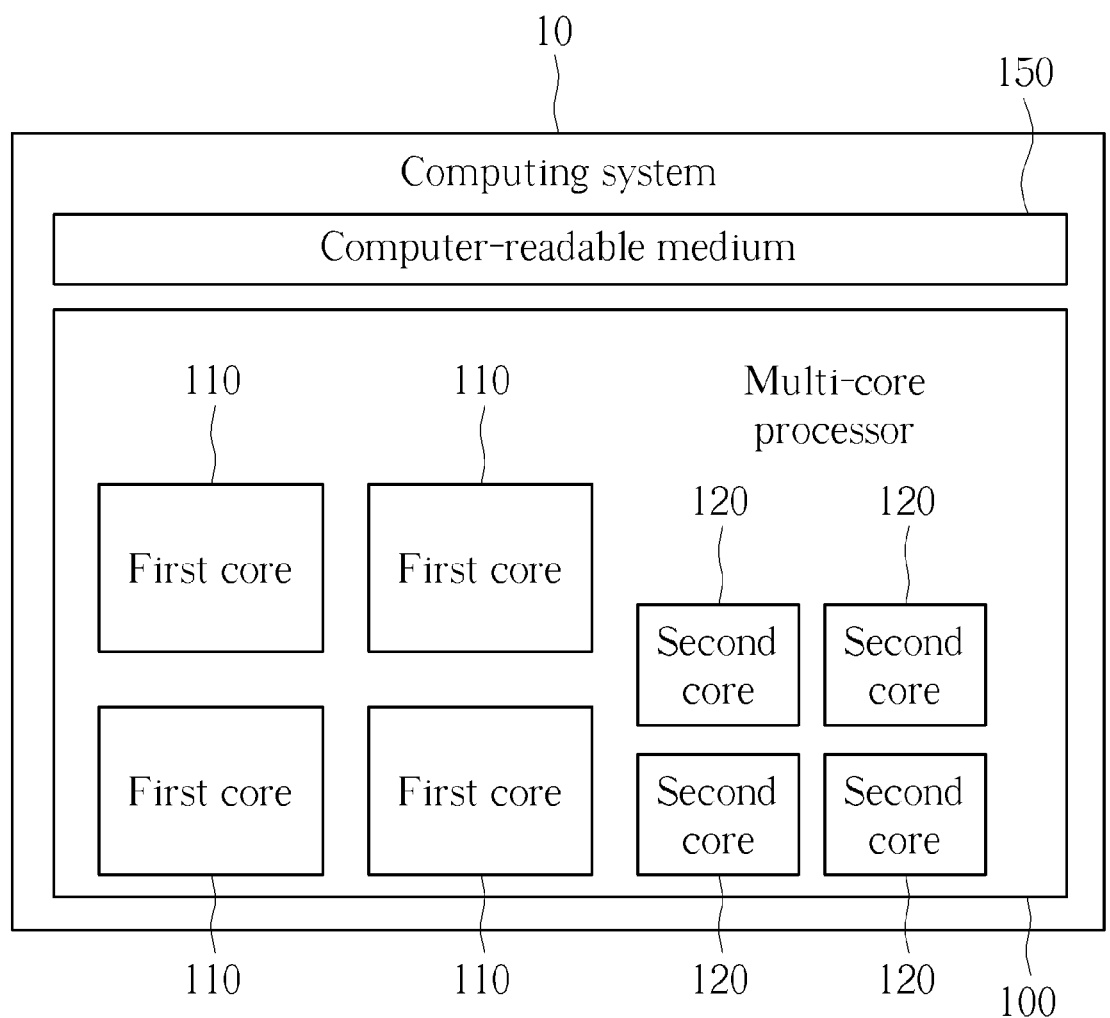
FIG. 1 is a functional block diagram of a computer system with a multi-core processor according to an embodiment of the present invention.

The multi-core processor may have a heterogeneous computing architecture which couples slower, low-power processor cores with more powerful and power-hungry ones. Please refer to FIG. 1. FIG. 1 is a functional block diagram of a computer system 10 with a multi-core processor 100 according to an embodiment of the present invention. The multi-core processor 100 has a plurality of first cores 110 and a plurality of second cores 120. In the embodiment, the multi-core processor 100 is a system on a chip (SOC). The multi-core processor 100 combines a plurality of first cores 110 with a plurality of second cores 120. The first cores 110 and the second cores 120 are architecturally compatible, such that the same instructions can be executed either by the first cores 110 or by the second cores 120. In the embodiment, the number of the first cores 110 is equal to four, and the number of the second cores 120 is also equal to four. However, the present invention is not limited thereto. The numbers of the first cores 110 and the second cores 120 may be equal to other positive integers.

Moreover, the performance of each first core 110 is greater than that of each second core 120, and the energy efficient of each second core 120 is greater than that of each first core 110. In other words, power consumed by each active first core 110 is greater than that of an active second core 120, and performance of the active first core 110 for executing instructions is greater than that of the active second core 120 for executing the same instructions. Accordingly, high-performance cores (i.e. the first cores 110) with energy efficient cores (i.e. the second cores 120) are combined on the same SOC (System-on-Chip) to reduce energy consumption (and hence preserve battery power), while still delivering peak performance. Since both the first cores 110 and the second cores 120 are architecturally compatible, workloads of the computer system 10 can be allocated to each core, on demand, to suit performance needs. High intensity tasks such as games are attempted to be allocated to the first cores 110, for example, while less demanding tasks such as email and audio playback are attempted to be allocated to the second cores 120.

In another embodiment of the present invention, the first cores 110 are embedded in a central processing unit (CPU) of the computing system 10, and the second cores 120 are embedded in a graphic processing unit (GPU) of the computing system 10. Recent studies suggest that using CPU and GPU together is a more efficient way of computing compared with using CPU or GPU alone. Data show that different types of computing processing units may be better suited to different types of workloads. For example, CPU is generally good at control-intensive workloads while GPU performs well at computing-intensive tasks.

In the present invention, a novel Dynamic Voltage and Frequency Scaling (DVFS) scheme which is different from any of the related art (if exists) is provided to dynamically manage power of the multi-core processor 100. As a result of applying the DVFS scheme of this embodiment to the multi-core processor 100, one or more operating frequencies and one or more operating voltages can be applying to the first cores 110, and one or more operating frequencies and one or more operating voltages can be applying to the second cores 120. Once any first core 110 or any second core 120 is applied an operating frequency and an operating voltage, the first core 110 or the second core 120 is active. In other words, if any first core 110 or any second core 120 is not applied any operating frequency (i.e. operating frequency is equal to 0 Hz) and any operating voltage (i.e. operating voltage is equal to 0 volts), the first core 110 or the second core 120 is not active. The operating frequency of the active first core 110 may be different from the operating frequency of the active second core 120, and the operating voltage of the active first core 110 may be different from the operating voltage of the active second core 120. However, the present invention is not limited thereto. That is, the operating frequency of the active first core 110 may be the same as the operating frequency of the active second core 120, and the operating voltage of the active first core 110 may be the same as the operating voltage of the active second core 120. Moreover, in an embodiment of the present invention, each active first core 110 is applied with the same operating frequency and the same operating voltage, and each active second core 120 is applied with the same operating frequency and the same operating voltage.

When the DVFS scheme is applied to the multi-core processor 100, the computing system 10 reads instructions from a computer-readable medium 150 to execute a power management process to dynamically adjust power settings of the first cores 110 and the second cores 120. The computer-readable medium 150 may be any available medium that can be accessed by a general purpose or special purpose computer. By way of example, and not limitation, the computer-readable media 150 can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of the computer-readable media 150.

In another embodiment, the instructions configured to execute the foresaid power management process may be built-in in the multi-core processor 100, the first cores 110 or the second cores 120. Once the computing system 100 is powered up, the built-in instructions would be executed by the first cores 110 and/or the second cores 120 to perform the foresaid power management process.

Figure 2:
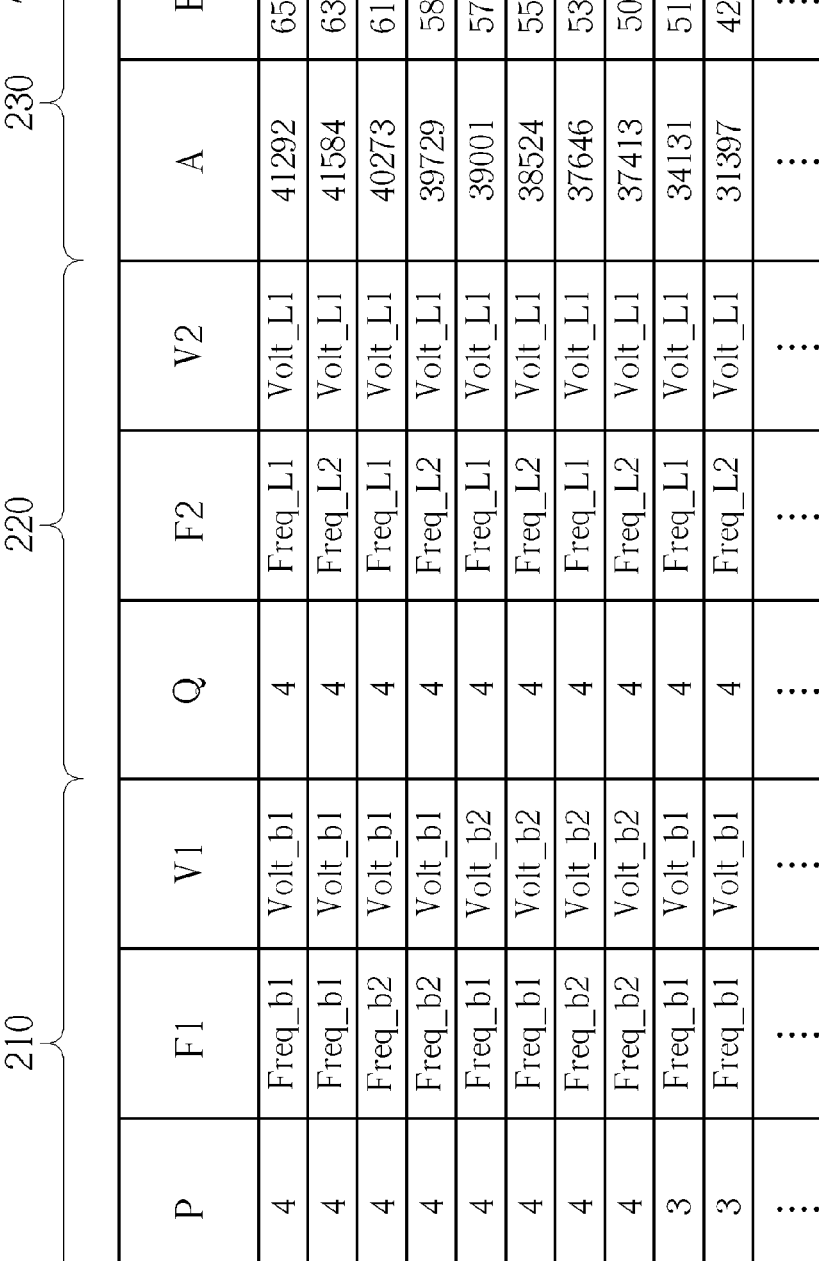
FIG. 2 illustrates data structure of a DVFS table of the multi-core processor shown in FIG. 1.

According to the foresaid power management process executed by the computing system 10, at least a dynamic voltage and frequency scaling (DVFS) table 200, as shown in FIG. 2, is generated by the computing system 10. The DVFS table 200 has a plurality of entries 204. Each of the entries 204 has a field of thread level parallelism (TLP) 202 and three categories of first settings 210, second settings 220 and reference indexes 230. As shown in FIG. 2, the category of first settings 210 comprises fields of first number P, first operating frequency F1 and first operating voltage V1, the category of second settings 220 comprises fields of second number Q, second operating frequency F2 and second operating voltage V2, and the category of reference indexes 230 comprises fields of performance index A and power index B. The first number P indicates the number of the active first core(s) 110, and the second number Q indicates the number of the active second core(s) 120.

The fields of the performance index A and the power index B are reference fields. The multi-core processor 100 may select an entry 204 from the DVFS table 200 by referencing the values of the fields of the performance index A and the power index B. The value of the performance index A indicates a quantified value of the performance of the multi-core processor 100 when the first cores 110 and the second cores 120 are configured according to a selected entry 204. The greater the value of the performance index A, the higher performance of the multi-core processor 100. Similarly, the value of the power index B indicates a quantified value of power required by the multi-core processor 100 when the first cores 110 and the second cores 120 are configured according to the selected entry 204. The greater the value of the power index B, the greater power is consumed by the multi-core processor 100. Therefore, one of the entries 204 may be selected from the DVFS table 200 according to a power budget and/or a required performance of the multi-core processor 100 by referencing the values of the fields of the performance index A and the power index B. Accordingly, the power and performance of the multi-core processor 100 may fit a predetermined condition that the power consumed by the multi-core processor 100 is not greater than the power budget and/or that the performance of the multi-core processor 100 is not less than the required performance.

After the DVFS table 200 is generated, the multi-core processor 100 determines a first index by alternatively selecting either a power budget or a required performance of the multi-core processor 100, and the multi-core processor 100 determines a current thread level parallelism (TLP) of the computing system 10. In an embodiment of the present invention, the current TLP is the sum of numbers of the active first core (s) 110 and the active second core (s) 120. In another embodiment of the present invention, the current TLP is calculated according a number of running tasks in run queues of an operating system (OS) of the information system 10. In an embodiment of the present invention, the current TLP is calculated according to sum of workload of the first cores 110 and the second cores 120.

In the case that the power budget of the multi-core processor 100 is determined as the first index and that the current TLP is the sum of numbers P and Q of the active first core(s) 110 and the active second core(s) 120. The multi-core processor 100 selects an entry 204 from the DVFS table 200 according to the current TLP and the power budget of the multi-core processor 100. Since the current TLP is the sum of numbers P and Q of the active first core(s) 110 and the active second core(s) 120, the current TLP falls within a range between 1 and 8. As shown in FIG. 2, a value of the field of TLP 202 of one entry 204 is a positive integer which is greater than 0 and less than 9. Once the current TLP and the first index are determined, the multi-core processor 100 selects an entry 204 from the DVFS table 200 according to the current TLP and the power budget (i.e. the first index) of the multi-core processor 100. The entries 204 having the values of field of the power index B that are greater than the power budget would not be selected. In other words, the entries 204 that the values of field of the power index B thereof not greater than the power budget are candidate entries 204, and the selected entry 204 would be selected just from the candidate entries 204. When the multi-core processor 100 selects an entry 204 from the candidate entries 204 according to the current TLP and the power budget, the entry 204 having the greater value of the field of the performance index A among the candidate entries 204 would be selected. For example, when the current TLP is 8 and the power budget of the multi-core processor 100 is 6000, the entry 204 that the value of the performance index A thereof is 39729 and the value of the power index B thereof is 5861 would be selected. When the entry 204 is selected, the first cores 110 are configured according to the first settings 210 of the selected entry 204 and the second cores 120 are configured according to the second settings 220 of the selected entry 204.

When the first cores 110 are configured according to the first settings 210 of the selected entry 204, P first core (s) 110 is active, the operating frequency of the P active first core (s) 110 is set to be the first operating frequency F1 of the selected entry 204, and the operating voltage of the P active first core (s) 110 is set to be the first operating voltage V1 of the selected entry 204. Similarly, when the second cores 120 are configured according to the second settings 220 of the selected entry 204, Q second core (s) 120 is active, the operating frequency of the Q active second core (s) 120 is set to be the second operating frequency F2 of the selected entry 204, and the operating voltage of the Q active second core (s) 120 is set to be the second operating voltage V2 of the selected entry 204.

In an embodiment of the present invention, the computing system 10 may have a temperature sensor for sensing the temperature of the multi-core processor 100, and the multi-core processor 100 may determines the power budget according to the sensed temperature. When the first cores 110 and the second cores 120 are configured, the power consumption of the multi-core processor 100 would be maintained to be less than or equal to the power budget, such that the multi-core processor 100 will not be overheated.

In an embodiment of the present invention, the plurality of entries 204 are generated according to an exhaustive approach for listing all possible combinations of the all fields of the DVFS table 200. For example, as shown in FIG. 2, the current TLP falls within a range between 1 and 8, the first operating frequency F1 may be equal to Freq_b1 or Freq_b2, the first operating voltage V1 may be equal to Volt_b1 or Volt_b2, the second operating frequency F2 may be equal to Freq_L1 or Freq_L2, and the second operating voltage V2 may be equal to Volt_L1. Accordingly, the DVFS table 200 may contain (8×2×2×2×1) entries 204.

In an embodiment of the present invention, the multi-core processor 100 may remove some of the entries 204 from the DVFS table 200 before selecting the entry 204 for configuring the first cores 110 and the second cores 120. After some of the entries 204 are removed from the DVFS table 200, the multi-core processor 100 selects the selected entry 204 from rest entries 204 of the DVFS table 200 so as to configure the first cores 110 and the second cores 120 according to the selected entry 204. Since some of the entries 204 are removed from the DVFS table 200, efficiency of selecting the selected entry 204 may be improved.

Figure 3:
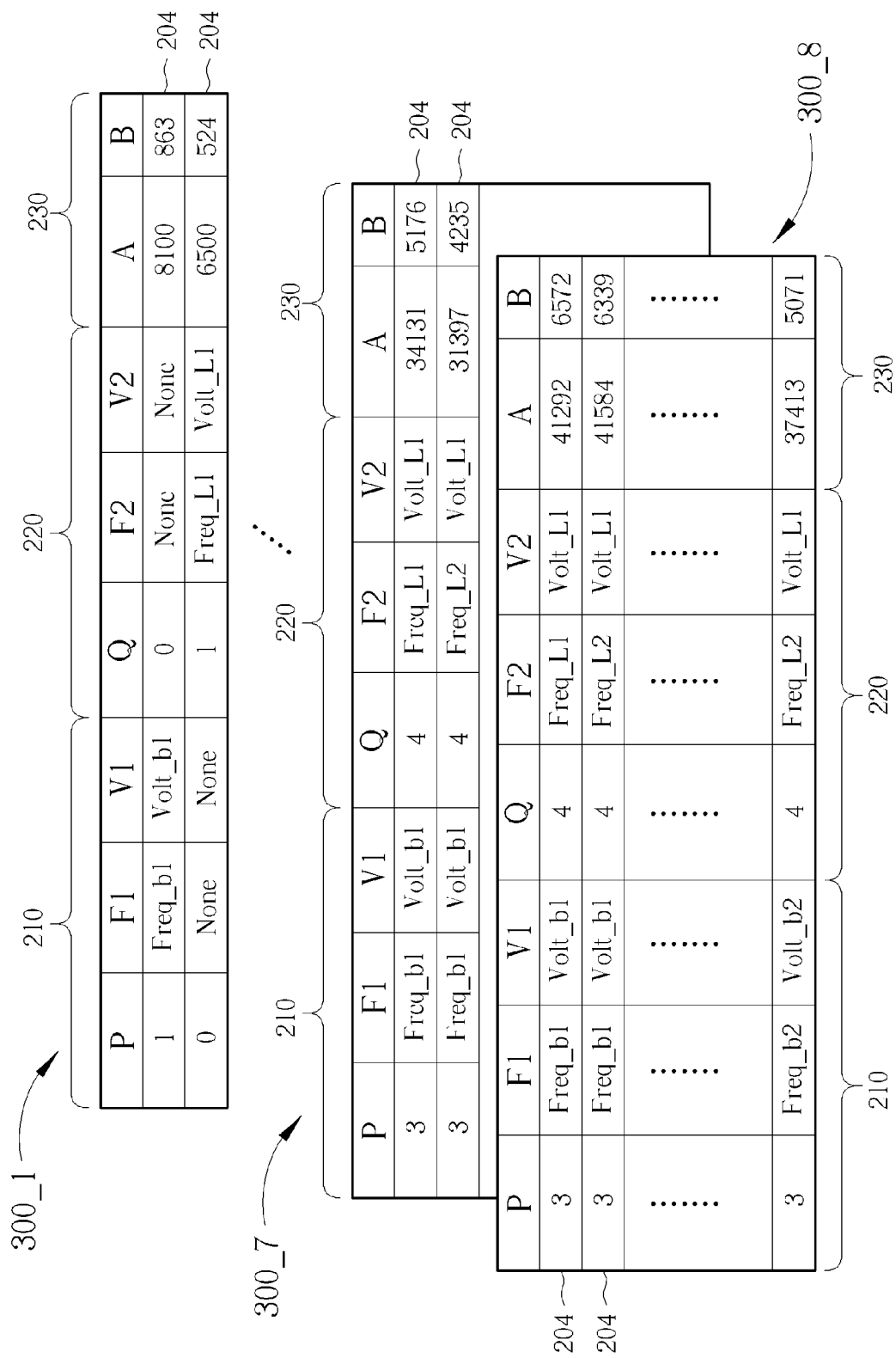
FIG. 3 illustrates data structure of DVFS tables of the multi-core processor shown in FIG. 1.

The DVFS table 200 may be divided into several small DVFS tables 300_1 to 300_8 as shown in FIG. 3 according to the value of TLP. In this case, since the current TLP falls within a range between 1 and 8, the DVFS table 200 is divided into eight DVFS tables 300_1 to 300_8, such that a number of the entries 204 of each of the DVFS tables 300_1 to 300_8 is less than the number of the entries 204 of the DVFS table 200. Each of the DVFS tables 300_1 to 300_8 corresponds to a unique value of TLP. For example, the DVFS table 300_1 corresponds to TLP with a value of 1, the DVFS table 300_7 corresponds to TLP with a value of 7, and the DVFS table 300_8 corresponds to TLP with a value of 8. When the multi-core processor 100 selects the selected entry 204, the multi-core processor 100 selects one of the DVFS tables 300_1 to 300_8 according to the current TLP and then selects the selected entry 204 from the selected DVFS table according to the first index (i.e. the power budget or the required performance of the multi-core processor 100).

In an embodiment of the present invention, the entries 204 of each DVFS tables 300_1 to 300_8 are generated according to an exhaustive approach for listing all possible combinations of the all fields of the DVFS table. Take the DVFS table 300_8 for example, the first operating frequency F1 may be equal to Freq_b1 or Freq_b2, the first operating voltage V1 may be equal to Volt_b1 or Volt_b2, the second operating frequency F2 may be equal to Freq_L1 or Freq_L2, and the second operating voltage V2 may be equal to Volt_L1. Accordingly, the DVFS table 300_8 may contain (2×2×2×1) entries 204.

In another embodiment of the present invention, the required performance of the multi-core processor 100 is determined as the first index and the current TLP is the sum of numbers P and Q of the active first core(s) 110 and the active second core(s) 120. The multi-core processor 100 selects an entry 204 from the DVFS table 200 according to the current TLP and the required performance of the multi-core processor 10. Once the current TLP and the first index are determined, the multi-core processor 100 selects an entry 204 from the DVFS table 200 according to the current TLP and the required performance (i.e. the first index) of the multi-core processor 100. The entries 204 having the values of field of the performance index A that are less than the required performance would not be selected. In other words, the entries 204 that the values of field of the performance index A thereof not less than the required performance are candidate entries 204, and the selected entry 204 would be selected just from the candidate entries 204. When the multi-core processor 100 selects an entry 204 from the candidate entries 204 according to the current TLP and the required performance, the entry 204 having the less value of the field of the power index B among the candidate entries 204 would be selected. For example, when the current TLP is 8 and the required performance of the multi-core processor 100 is 40000, the entry 204 that the value of the performance index A thereof is 40273 and the value of the power index B thereof is 6192 would be selected. When the entry 204 is selected, the first cores 110 are configured according to the first settings 210 of the selected entry 204 and the second cores 120 are configured according to the second settings 220 of the selected entry 204. Accordingly, when the first cores 110 and the second cores 120 are configured according to the first settings 210 and the second settings 220 of the selected entry 204, the performance of the multi-core processor 100 would be maintained to be greater than or equal to the required performance.

Figure 4:
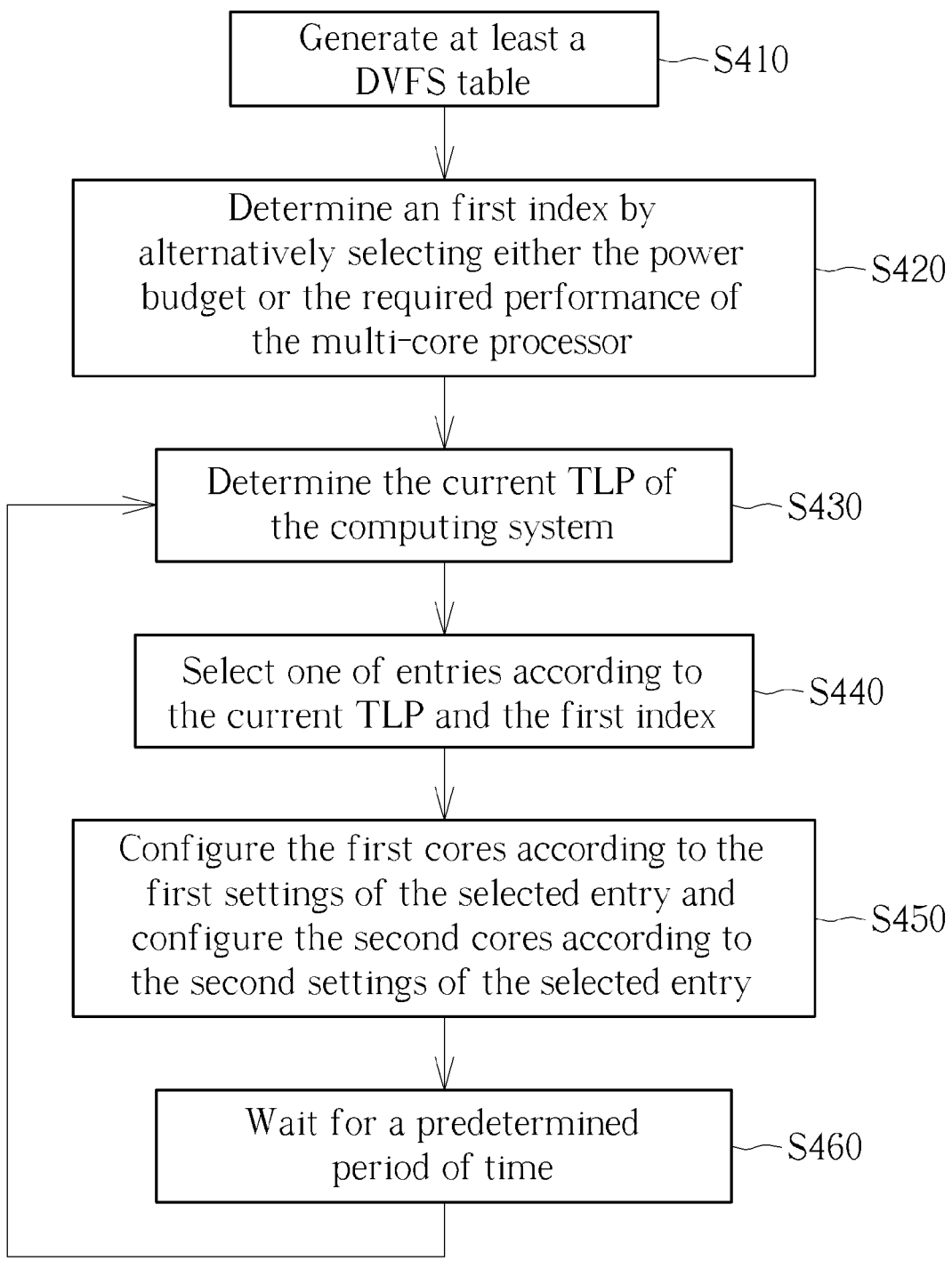
FIG. 4 is a flow chart of a method for dynamically managing power of a multi-core processor according to an embodiment of the present invention.

Please refer to FIG. 4. FIG. 4 is a flow chart of a method for dynamically managing power of the multi-core processor 100 according to an embodiment of the present invention. The method comprises steps of:

S410: Generate at least a DVFS table (e.g. the DVFS table 200 or the DVFS tables 300_1 to 300_8);

S420: Determine the first index by alternatively selecting either the power budget or the required performance of the multi-core processor 100;

S430: Determine the current TLP of the computing system 10;

S440: Select one of entries 204 according to the current TLP and the first index;

S450: Configure the first cores 110 according to the first settings 210 of the selected entry 204 and configure the second cores 120 according to the second settings 220 of the selected entry 204; and S460: Wait for a predetermined period of time, and then go back to S430.

Since the computing system 10 executes steps S430 to S460 periodically, the first cores 110 and the second cores 120 would be configured periodically to fit the current TLP. Therefore, the operating voltages and operating frequencies of the first cores 110 and the second cores 120 are adjusted dynamically based on the current TLP.

Figure 5:
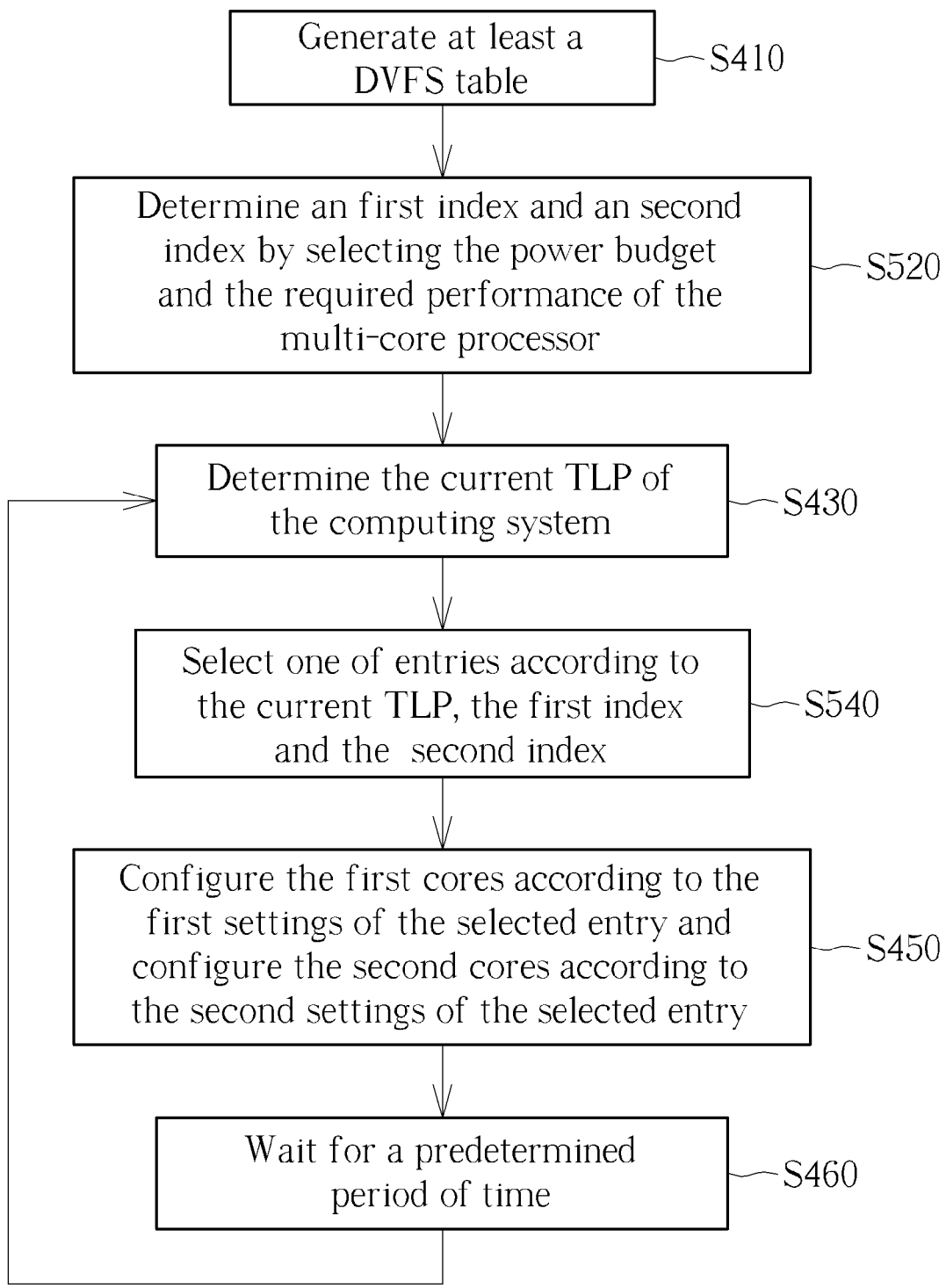
FIG. 5 is a flow chart of a method for dynamically managing power of a multi-core processor according to another embodiment of the present invention.

In another embodiment of the present invention, the selected entry 204 is selected according to both of the power budget and the required performance of the multi-core processor 100. In other words, if the first index is the required performance of the multi-core processor 100, the power budget of the multi-core processor 100 may be another index for selecting the selected entry 204. If the first index is the power budget of the multi-core processor 100, the required performance of the multi-core processor 100 may be another index for selecting the selected entry 204. Therefore, the selected entry is selected according to the current TLP, the power budget and the required performance of the multi-core processor 100. Please refer to FIG. 5. FIG. 5 is a flow chart of a method for dynamically managing power of a multi-core processor according to another embodiment of the present invention. In the embodiment, steps S420 and S440 are respectively replaced by steps S520 and S540, and the method comprises steps of:

S410: Generate at least a DVFS table (e.g. the DVFS table 200 or the DVFS tables 300_1 to 300_8);

S520: Determine the first index and the second index by selecting the power budget and the required performance of the multi-core processor 100;

S430: Determine the current TLP of the computing system 10;

S540: Select one of entries 204 according to the current TLP, the first index and the second index;

S450: Configure the first cores 110 according to the first settings 210 of the selected entry 204 and configure the second cores 120 according to the second settings 220 of the selected entry 204; and S460: Wait for a predetermined period of time, and then go back to S430.

In another embodiment of the present invention, the power budget and the required performance of the multi-core processor 100 are selected as the first index and the second index, and the current TLP is the sum of numbers P and Q of the active first core(s) 110 and the active second core(s) 120. The multi-core processor 100 selects an entry 204 from the DVFS table 200 according to the current TLP, the power budget and the required performance of the multi-core processor 100. The entries 204 having the values of field of the performance index A that are less than the required performance or having the values of field of the power index B that are greater than the power budget would not be selected. In other words, the entries 204 that the values of field of the performance index A thereof not less than the required performance and the values of field of the power index B thereof not greater than the power budget are candidate entries 204, and the selected entry 204 would be selected just from the candidate entries 204. When the multi-core processor 100 selects an entry 204 from the candidate entries 204 according to the current TLP, the power budget and the required performance, the entry 204 having the greater value of the field of the performance index A or having the less value of the field of the power index B among the candidate entries 204 would be selected. For example, when the current TLP is 8, the required performance is 41000, and the power budget is 6350, the entry 204 that the value of the performance index A thereof is 41584 and the value of the power index B thereof is 6339 would be selected. When the entry 204 is selected, the first cores 110 are configured according to the first settings 210 of the selected entry 204 and the second cores 120 are configured according to the second settings 220 of the selected entry 204. Accordingly, when the first cores 110 and the second cores 120 are configured, the performance of the multi-core processor 100 would be maintained to be greater than or equal to the required performance, and the power consumption of the multi-core processor 100 would be maintained to be less than or equal to the power budget.

Since the entry 204 is selected according to both of the power budget and the required performance of the multi-core processor 100, the power consumption of the multi-core processor 100 would be maintained to be less than or equal to the power budget and the performance of the multi-core processor 100 would be maintained to be greater than or equal to the required performance when the first cores 110 and the second cores 120 are configured. Accordingly, the multi-core processor 100 will not be overheated, and the performance of the multi-core processor 100 would not be sacrificed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for dynamically managing power of a multi-core processor of a computing system, the multi-core processor having a plurality of first cores and a plurality of second cores, and the method comprising:
   generating at least a dynamic voltage and frequency scaling (DVFS) table with a plurality of entries, wherein each of the entries comprises first settings for the first cores and second settings for the second cores;
   determining a first index by alternatively selecting either a power budget or a required performance of the multi-core processor;
   determining a current thread level parallelism (TLP) of the computing system;
   selecting one of entries according to the current TLP and the first index; and
   configuring the first cores according to the first settings of the selected entry and configuring the second cores according to the second settings of the selected entry.

2. The method of claim 1, wherein the first settings comprise M fields, and the second settings comprise N fields, M and N are positive integers, the plurality of entries are generated according to an exhaustive approach for listing all possible combinations of the M fields and the N fields.

3. The method of claim 2 further comprising:
   removing some of the entries from the at least a DVFS table;
   wherein the selected entry is selected from rest entries of the at least a DVFS table.

4. The method of claim 1, wherein the at least a DVFS table comprises a plurality of DVFS tables, and the method further comprises:
   selecting one of the DVFS tables according to the current TLP;
   wherein the selected entry is selected from the selected DVFS table according to the first index.

5. The method of claim 1, wherein the first index is the power budget of the multi-core processor, and the method further comprises:
   sensing a temperature of the multi-core processor;
   wherein the power budget is determined according to the sensed temperature.

6. The method of claim 1, wherein the first index is the power budget of the multi-core processor, and power consumption of the multi-core processor is maintained to be less than or equal to the power budget while the first cores and the second cores are configured according to the first settings and the second settings of the selected entry.

7. The method of claim 1, wherein the first index is the required performance of the multi-core processor, and performance of the multi-core processor is maintained to be greater than or equal to the required performance while the first cores and the second cores are configured according to the first settings and the second settings of the selected entry.

8. The method of claim 1 further comprising:
   determining a second index, wherein the second index is the power budget of the multi-core processor if the first index is the required performance of the multi-core processor, and the second index is the required performance of the multi-core processor if the first index is the power budget of the multi-core processor;
   wherein the selected entry is selected according to the current TLP, the first index and the second index.

9. The method of claim 1, wherein the current TLP is calculated according to a sum of workload of the first cores and the second cores.

10. The method of claim 1, wherein the current TLP is calculated according a number of running tasks in run queues of an operating system (OS) of the computing system.

11. The method of claim 1, wherein steps of determining the current TLP, selecting one of the plurality of entries and configuring the first cores and second cores are executed periodically.

12. The method of claim 1, wherein the first settings of the selected entry comprise a first number, a first operating frequency and a first voltage, and the second settings of the selected entry comprise a second number, a second operating frequency and a second voltage, the first number and the second number are integers greater than or equal to 0, and a sum of the first number and the second number is a positive integer;
   wherein when the first cores are configured according to the first settings of the selected entry, P first core(s) of the first cores is active, an operating frequency of the P first core(s) is set to be the first operating frequency, and an operating voltage of the P first core(s) is set to be the first operating voltage, P is equal to the first number;
   wherein when the second cores are configured according to the second settings of the selected entry, Q second core(s) of the second cores is active, an operating frequency of the Q second core(s) is set to be the second operating frequency, and an operating voltage of the Q second core(s) is set to be the second operating voltage, Q is equal to the second number.

13. The method of claim 1, wherein the multi-core processor has a heterogeneous computing architecture, power consumed by an active first core of the first cores is greater than power consumed by an active second core of the second cores, and performance of the active first core for executing instructions is greater than the active second core for executing the instructions.

14. The method of claim 1, wherein the first cores are embedded in a central processing unit (CPU) of the computing system, and the second cores are embedded in a graphic processing unit (GPU) of the computing system.

15. A non-transitory computer-readable medium storing instructions which cause a computer system to execute a power management process for dynamically adjusting power settings of a plurality of first cores and a plurality of second cores of a multi-core processor of a computing system, the power management process comprising:
   generating at least a dynamic voltage and frequency scaling (DVFS) table with a plurality of entries, wherein each of the entries comprises first settings for the first cores and second settings for the second cores;
   determining a first index by alternatively selecting either a power budget or a required performance of the multi-core processor;
   determining a current thread level parallelism (TLP) of the computing system;
   selecting one of entries according to the current TLP and the first index; and
   configuring the first cores according to the first settings of the selected entry and configuring the second cores according to the second settings of the selected entry.

16. The non-transitory computer-readable medium of claim 15, wherein the first index is the power budget of the multi-core processor, and the method further comprises:
   sensing a temperature of the multi-core processor;
   wherein the power budget is determined according to the sensed temperature.

17. The non-transitory computer-readable medium of claim 15, wherein the first index is the power budget of the multi-core processor, and power consumption of the multi-core processor is maintained to be less than or equal to the power budget while the first cores and the second cores are configured according to the first settings and the second settings of the selected entry.

18. The non-transitory computer-readable medium of claim 15, wherein the first index is the required performance of the multi-core processor, and performance of the multi-core processor is maintained to be greater than or equal to the required performance while the first cores and the second cores are configured according to the first settings and the second settings of the selected entry.

19. The non-transitory computer-readable medium of claim 15, wherein the power management process further comprises:
   determining a second index, wherein the second index is the power budget of the multi-core processor if the first index is the required performance of the multi-core processor, and the second index is the required performance of the multi-core processor if the first index is the power budget of the multi-core processor;
   wherein the selected entry is selected according to the current TLP, the first index and the second index.

20. The non-transitory computer-readable medium of claim 15, wherein steps of determining the current TLP, selecting one of the plurality of entries and configuring the first cores and second cores are executed periodically.

* * * * *